United States Patent [19]

Harner et al.

[11] Patent Number: 4,656,362

[45] Date of Patent: Apr. 7, 1987

[54] BLADE PITCH ANGLE CONTROL FOR LARGE WIND TURBINES

[75] Inventors: Kermit I. Harner, Windsor; Frank R. Niessen, East Windsor; Robert Sherman, West Hartford, all of Conn.

[73] Assignee: United Technologies Corporation, Hartford, Conn.

[21] Appl. No.: 722,767

[22] Filed: Apr. 16, 1985

Related U.S. Application Data

[63] Continuation of Ser. No. 440,122, Nov. 8, 1982, abandoned.

[51] Int. Cl.[4] .......... F03D 7/04

[52] U.S. Cl. .......... 290/44; 290/55; 416/43

[58] Field of Search .......... 290/44, 55; 416/43, 416/44

[56] References Cited

U.S. PATENT DOCUMENTS 2,653,250 9/1953 Romani .......... 290/4
2,738,183 3/1956 Quinn et al. .......... 264/9
2,832,895 4/1958 Hüller .......... 290/44
3,269,121 8/1966 Bening .......... 416/43 A
3,589,830 6/1971 Mogren et al. .......... 416/1
4,160,170 7/1979 Harner et al. .......... 290/44

FOREIGN PATENT DOCUMENTS 2384964 11/1978 France .......... 290/44

*Primary Examiner*—William M. Shoop, Jr.
*Assistant Examiner*—W. E. Duncanson, Jr.
*Attorney, Agent, or Firm*—John Swiatocha

[57] ABSTRACT

A blade pitch angle control system for a wind turbine includes an improved control means (95) for providing a minimum pitch angle reference signal indicative of desired blade pitch at wind velocities less than rated. The control means includes means (35 and 30) for providing signals indicative of generated (output) power or torque and the rotational frequency of the wind turbine rotor. The output and rotor speed signals are input to a function generator which, in response to such signals, provides a signal indicative of the minimum pitch angle.

5 Claims, 2 Drawing Figures

40
$\dot{\beta}_R$
15
45
+
-
50
60
75
70
$\frac{1}{S}$
55
MIN β
MAX β
80
$\beta_R$
85
90
100
10
MIN β
$\left(\frac{NO}{NR}\right)^3 P$
95
NR
20
P
25
30
35

BLADE PITCH ANGLE CONTROL FOR LARGE WIND TURBINES

This is a continuation of application Ser. No. 440,122 filed on Nov. 8, 1982 now abandoned.

TECHNICAL FIELD

This invention relates to the control of blade pitch angle in horizontal axis wind turbine-generators and particularly to blade pitch angle control under conditions of low wind velocity.

BACKGROUND ART

Modern, large horizontal axis wind turbine-generators generally include two or more variable pitch blades mounted on a rotor which drives a synchronous generator through a gear box, the gear box serving to step up the rotational speed of the main turbine shaft to the speed required for synchronous operation of the generator. In such wind turbine-generators, it is generally desirable to control blade pitch in response to wind conditions and turbine output requirements. A suitable blade pitch control system for large wind turbine-generators is disclosed in U.S. Pat. No. 4,193,005 to Kos et al. This control system is a closed-loop system which provides a blade pitch angle reference signal to a blade pitch change actuation system based on such parameters as wind conditions, desired turbine-generator operating conditions and actual turbine-generator operating conditions. The system of the Kos et al patent includes four discrete controllers: a first controlling rotor acceleration during start up, a second controlling rotor deceleration during shutdown, a third controlling rotor speed when the synchronous generator is off-line and a fourth controlling power or torque when the generator is on-line. The controllers provide a time derivative pitch angle reference signal as an input signal to an integrator. The output of the integrator is the blade pitch angle reference signal noted hereinabove. The integrator includes maximum and minimum blade angle stops. The maximum stop corresponds to a blade pitch angle of 90° (full blade feathering) while the minimum blade angle stop is variable, being a function of rotor speed and measured wind speed.

As explained in the Kos et al patent, the blade pitch angle reference signal set by the controller is limited to a minimum value (the minimum integrator stop) under wind velocity conditions between cut-in velocity (the minimum wind velocity at which the wind turbine-generator is capable of producing useful power), and rated velocity (the minimum wind velocity at which the wind turbine-generator may produce rated power). It is crucial to the operation of the wind turbine that in this range of wind velocities, the pitch angle of the blades be set to such a minimum value for capture of the greatest possible amount of energy from the wind stream. At wind velocities greater than those within this range, more than enough wind energy is available for the generation of rated power and hence, energy is "spilled"0 from the blades as the wind turbine operates. However, within this range, the blades must be precisely set at minimum pitch angles wherein no significant amount of energy is spilled from the blades.

In the Kos et al control system, values of minimum pitch angle ($\beta_{min}$) as a function of velocity ratio $\lambda$ (a product of a constant, the blade diameter and frequency of blade rotation divided by wind velocity) are stored in a function generator or memory 204. It will be appreciated then, that in order to provide an accurate $\beta_{min}$ signal, function generator 204 must be input with accurate readings of wind velocity and rotor frequency of rotation. While the frequency of rotation of the rotor is easily and accurately measurable, an accurate determination of wind velocity is not so easily achieved. Heretofore, it has been the practice to measure wind velocity from a point sensor mounted at a location removed from the wind turbine rotor. It will be appreciated that such a sensor will only sense wind conditions at its immediate location and therefore, due to the presence of nonuniformities in wind velocity, may not accurately reflect the velocity conditions at the rotor. Moreover, even if the velocity sensor could accurately measure wind velocity conditions at the rotor, such a measurement would still be only indicative of wind velocity at the location of the sensor. For accuracy, the minimum blade pitch angle signal should be based on wind conditions integrated over the entire area of the rotor. Clearly, a point wind velocity sensor is not capable of such measurements. Under those low wind velocity conditions wherein minimum blade pitch angle controls the operation of the turbine, even a slight error in the determination of wind velocity can result in blade pitch angle settings wherein the amount of wind energy which the turbine is capable of capturing and, therefore, turbine output, are significantly jeopardized.

DISCLOSURE OF INVENTION

It is therefore a principal object of the present invention to provide an improved means for accurately determining a minimum blade pitch angle setting for large wind turbine-generators operating at less than rated wind velocity conditions.

It is another object of the present invention to provide such a means wherein the blade pitch angle setting is determined on the basis of wind velocity conditions over the entire wind turbine rotor rather than at a single point location.

It is another object of the present invention to provide such a means wherein a minimum blade pitch angle is determined on the basis of conditions which are accurately and conveniently measurable.

In accordance with the present invention, a minimum pitch angle reference signal for wind turbine blade pitch control at less than rated wind velocity conditions is determined on the basis of turbine output power or torque rather than wind velocity measured at a point location. By basing the minimum required blade pitch angle on power or torque, the blade pitch angle reference signal is calculated on the basis of conditions integrated over the entire wind turbine rotor rather than at a single point location removed therefrom. Moreover, torque and power are more accurately measurable than is wind velocity thereby further enhancing the accuracy of the resulting minimum blade pitch angle reference signal. Such enhancement of the accuracy of calculated blade pitch angle signal optimizes the wind energy capture capabilities of the turbine and, therefore, the output capabilities thereof.

BEST MODE FOR CARRYING OUT THE INVENTION AND INDUSTRIAL APPLICABILITY

Figure 1:
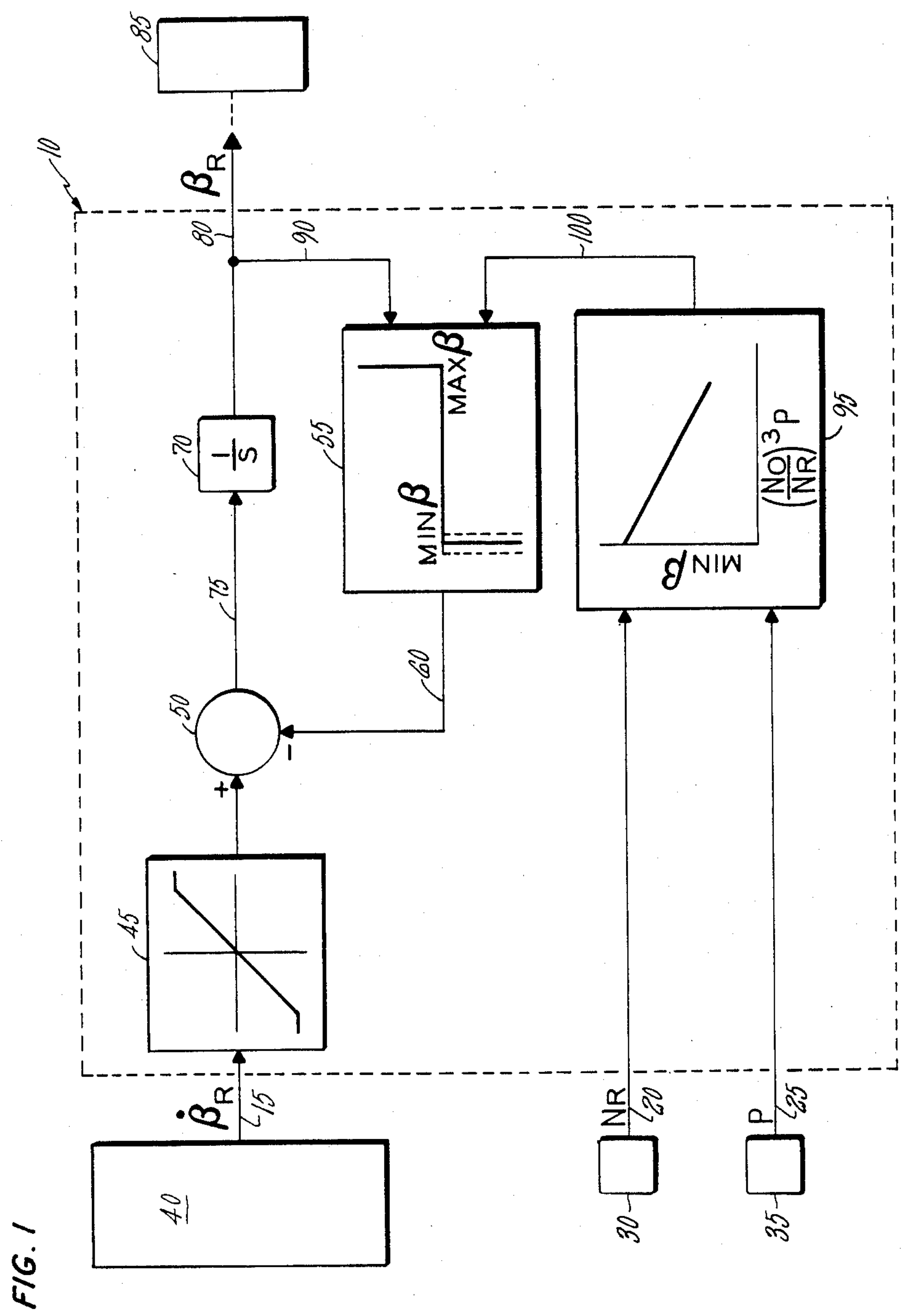
FIG. 1 is a schematic diagram of the preferred embodiment of the wind turbine-generator blade pitch control of the present invention.

Referring to FIG. 1, the blade pitch angle control system of the present invention is shown generally within broken line 10. The system is input with the time derivative ($\dot{\beta}_R$) of a blade pitch angle reference signal on line 15, a signal ($N_R$) indicative of the actual frequency of the rotation of the wind turbine rotor on line 20, and on line 25, a signal (P) indicative of actual output power of the wind turbine. The frequency of rotation and power signals may be readily obtained from suitable transducers 30 and 35, respectively, which are well known in the art. The time derivative ($\dot{\beta}_R$) of the blade pitch angle signal is obtained from controller 40 which for example, may comprise the controller of the hereinabove noted U.S. Pat. No. 4,193,005 less the integrator section thereof shown in FIG. 8 of that patent. Thus, the $\dot{\beta}_R$ signal on line 15 is provided from, for example, the mode selector 96 of the Kos et al system, further details regarding the construction and operation of the Kos et al system being readily available from the patent. Reference to the patent shows that control system 10 of the preferred embodiment corresponds generally to that portion of the system shown in FIG. 8 of the patent and referred to at 104 of the block diagram of FIG. 3 thereof.

Still referring to the FIG. 1 herein, the derivative signal on line 15 is fed to a limiter 45 which limits the signal to values consistent with the capabilities of the blade pitch actuators in the pitch change actuation system of the turbine. By way of example, where the blade pitch is set by hydraulic actuators, limiter 45 limits the derivative signal to values corresponding to the capabilities of a slew pump which provides pressurized hydraulic fluid to the actuators. From limiter 45 the limited derivative signal is fed to a summing junction 50 which takes the difference between the limited derivative signal and an output signal on line 60 from circuit 55 and feeds this difference to integrator 70 via line 75. Integrator 70 integrates the derivative signal, thereby providing a blade pitch angle reference signal $\beta_R$ along line 80 to a blade pitch actuation system 85 which sets the pitch of the wind turbine blades to that reference signal. The pitch actuation system forms no part of the present invention and is, therefore, not described herein. However, a suitable wind turbine pitch actuation system is described in U.S. Pat. No. 4,348,155 to Barnes et al.

The blade pitch angle reference signal from line 80 is fed to circuit 55 through line 90. Circuit 55 compares the pitch angle reference signal to maximum and minimum allowable pitch angle values therein and, if the reference signal on line 90 falls between the maximum and minimum allowable signals, provides a zero output to summing junction 50 through line 60. In the event that the pitch angle reference signal on line 80 is greater than the maximum allowable (90°) reference signal corresponding to a feathered condition of the blades, circuit 55 provides a high gain output signal on line 60 which effectively cancels the time derivative input signal to summing junction 50 to shut integrator 70 off thereby limiting the maximum allowable pitch angle reference signal provided to actuator system 85° to 90°. In a similar manner, in the event that the pitch angle reference signal on line 80 is less than a minimum allowable pitch angle (MIN $\beta$) circuit 55 provides a high gain output signal on line 60 which in summing junction 50, cancels the time derivative signal to prevent the integrator 70 from integrating to a value less than a minimum value corresponding to the desired blade pitch angle setting under minimum (less than rated) wind velocity conditions. As noted hereinabove, the maximum blade pitch angle signal within circuit 55 is a constant (90°) stored therein while the minimum pitch angle signal (MIN $\beta$) is a variable which is input to circuit 55 from function generator 95 through line 100.

As noted above, under conditions of less than rated wind velocity, the wind turbine's blades are set to the MIN $\beta$ position corresponding to optimal capture of wind energy by the blades with no "spillage" of wind therefrom. As further noted, to achieve such optimal energy capture, the accuracy of the MIN $\beta$ signal must be optimized. In accordance with the present invention, such signal accuracy is achieved by function generator 95 which provides a MIN $\beta$ output signal to line 100 based upon the rotational frequency of the wind turbine rotor and the power output thereof rather than wind velocity at a point location. As indicated in the drawing, values of MIN $\beta$ are stored within function generator 95 as functions of $$\left(\frac{N_O}{N_R}\right)^3 P.$$

In this expression, as set forth hereinabove, P is indicative of the actual output power of the turbine and $N_R$ the frequency of rotation of the turbine rotor. $N_O$ is the nominal frequency of rotation of the turbine rotor or, in other words, the maximum frequency of rotation of the rotor at cut-in wind velocity.

It will be appreciated by those skilled in the art that output power is itself a function of wind velocity. Thus, by basing the MIN $\beta$ reference signal on output power, this signal is in effect based on wind velocity conditions across the entire diameter of the wind turbine rotor thereby enhancing the accuracy of this reference signal. The accuracy with which turbine output power is measured further enhances the accuracy of the pitch angle reference signal.

Figure 2:
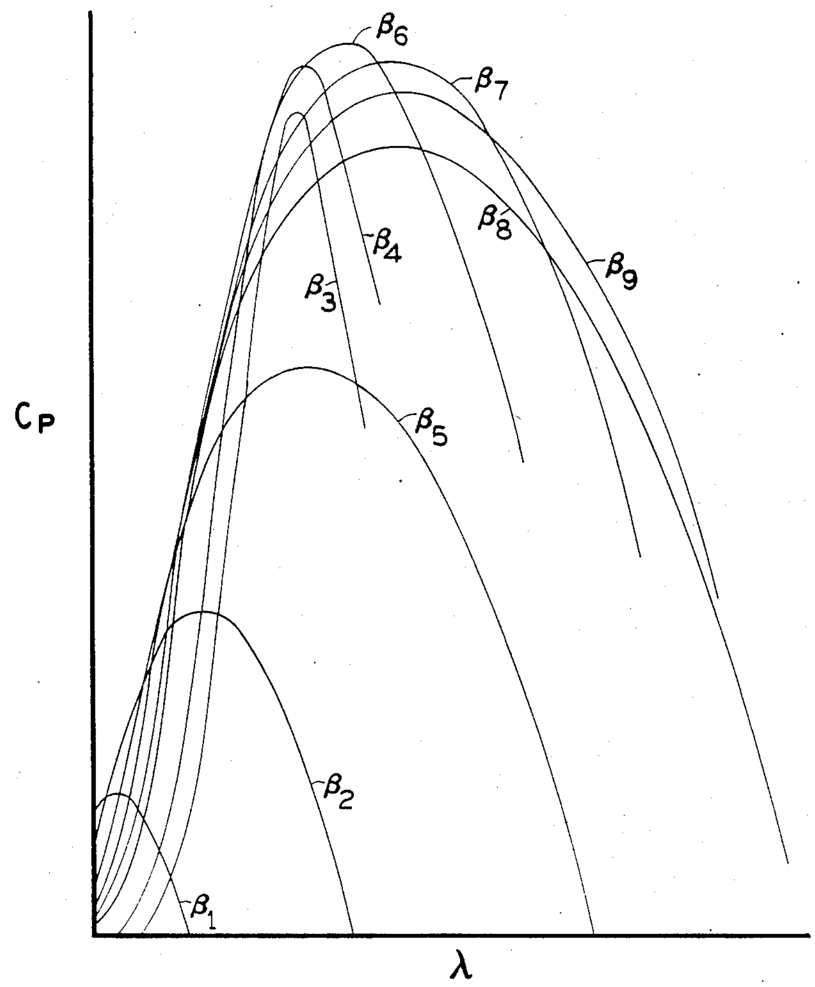
FIG. 2 is a performance map for a typical large wind turbine-generator.

Function generator 95 may be programmed as follows. Referring to FIG. 2, there is shown a performance map for a typical large wind turbine-generator, the map being determined by known analytical techniques on the basis of turbine geometry. It is seen that the performance map comprises a family of curves which plot power coefficient $C_P$ (the ratio of the amount of power which may be captured by the turbine to the amount of available power in the wind stream intercepted by the turbine) against velocity ratio for a number of different blade pitch angle settings. It will be seen that for any one value of velocity ratio λ, there exists a corresponding single maximum power coefficient at a single pitch angle. Stated conversely, for every maximum power coefficient, there is a blade angle setting by which the wind turbine may attain such a power coefficient for a given velocity ratio. For any velocity ratio λ, from the data available in FIG. 2, a nominal wind velocity may be calculated from the following expression:

$$V_0 = \frac{\pi N_0 D}{60\lambda}$$

wherein D is the diameter of the wind turbine rotor. Having calculated the nominal wind velocity, nominal power may be calculated from the expression:

$$P_O = \tfrac{1}{2}\rho\pi\frac{D^2}{4}(V_O)^3 C_{PO}$$

wherein $\rho$ is the density of the air; and $C_{PO}$ is the maximum power coefficient corresponding to the velocity ratio by which $V_O$ was calculated.

Thus, it is seen that for each pitch angle corresponding to a maximum power coefficient in FIG. 2, there is a value of nominal power associated therewith. Function generator 95 provides the blade pitch angle setting (MIN $\beta$) at which such nominal output power is achieved at a given wind velocity, or, in other words, the blade pitch angle setting wherein an optimum amount of energy may be captured from the wind at such a velocity. In function generator 95, the expression $$\left(\frac{N_O}{N_R}\right)^3$$

is a correction factor necessitated by the fact that the calculated power is a nominal power. Actual power is related to nominal power by the expression $$\frac{P_O}{P} = \left(\frac{N_O}{N_R}\right)^3.$$

The wind turbine blade pitch control system of the present invention is readily implemented by either analog or digital techniques. Accordingly, the circuit 95 described hereinabove as a function generator may comprise a digital data lookup memory. Likewise, the other components described hereinabove may comprise analog or digital apparatus. While the control system has been described with respect to providing a minimum blade angle system based on output power, it will be appreciated that the pitch angle signal may be based on turbine shaft torque with equal utility, it being recognized that actual torque, like power, provides a basis for a minimum blade angle setting which essentially integrates wind speed conditions across the entire turbine rotor. Moreover, while the system herein has been described in exemplary fashion as a subsystem for a blade pitch angle control system such as the patented Kos et al system, it will be understood that the system of the present invention is not limited to such use and may be employed in any blade pitch control system requiring a signal indicative of minimum pitch angle at low wind velocities.

Having thus described the invention, what is claimed is:

1. In a blade pitch angle control system for a wind turbine-generator comprising a rotor having a plurality of variable pitch airfoil blades fixed thereto and driving an electric generator through a drive train, said blade pitch angle control system including control means providing a reference signal indicative of desired blade pitch angle at less than rated wind speed conditions, said control means being characterized by:

means providing an output signal indicative of actual wind turbine output;

means providing a frequency signal indicative of rotational frequency of said wind turbine; and signal processing means responsive to said output and frequency signals for continuously providing a minimum allowable blade pitch angle reference signal based on the aerodynamic performance capabilities of said airfoil blades and corresponding to attainment by said wind turbine of said output at less than rated wind velocity and at an optimal power ratio.

2. The blade pitch angle control system according to claim 1 further characterized by said output signal comprising a signal indicative of the actual electrical output of said electric generator.

3. The blade pitch angle control system according to claim 1 further characterized by said output signal comprising a signal indicative of drive train torque.

4. The blade pitch angle control system according to claim 1 further characterized by said signal processing means providing said blade pitch angle reference signal further as a function of the nominal frequency of rotation of said wind turbine.

5. The blade pitch angle control system according to claim 4 further characterized by said signal processing means providing said blade pitch angle reference signal as a function of the product of said output signal and the cube of the quotient of said rotational frequency of said wind turbine and said nominal frequency of rotation of said wind turbine.

* * * * *